June 5, 1962
R. N. FOSS
3,038,112
ELECTRICAL POWER SUPPLY
Filed Dec. 8, 1959
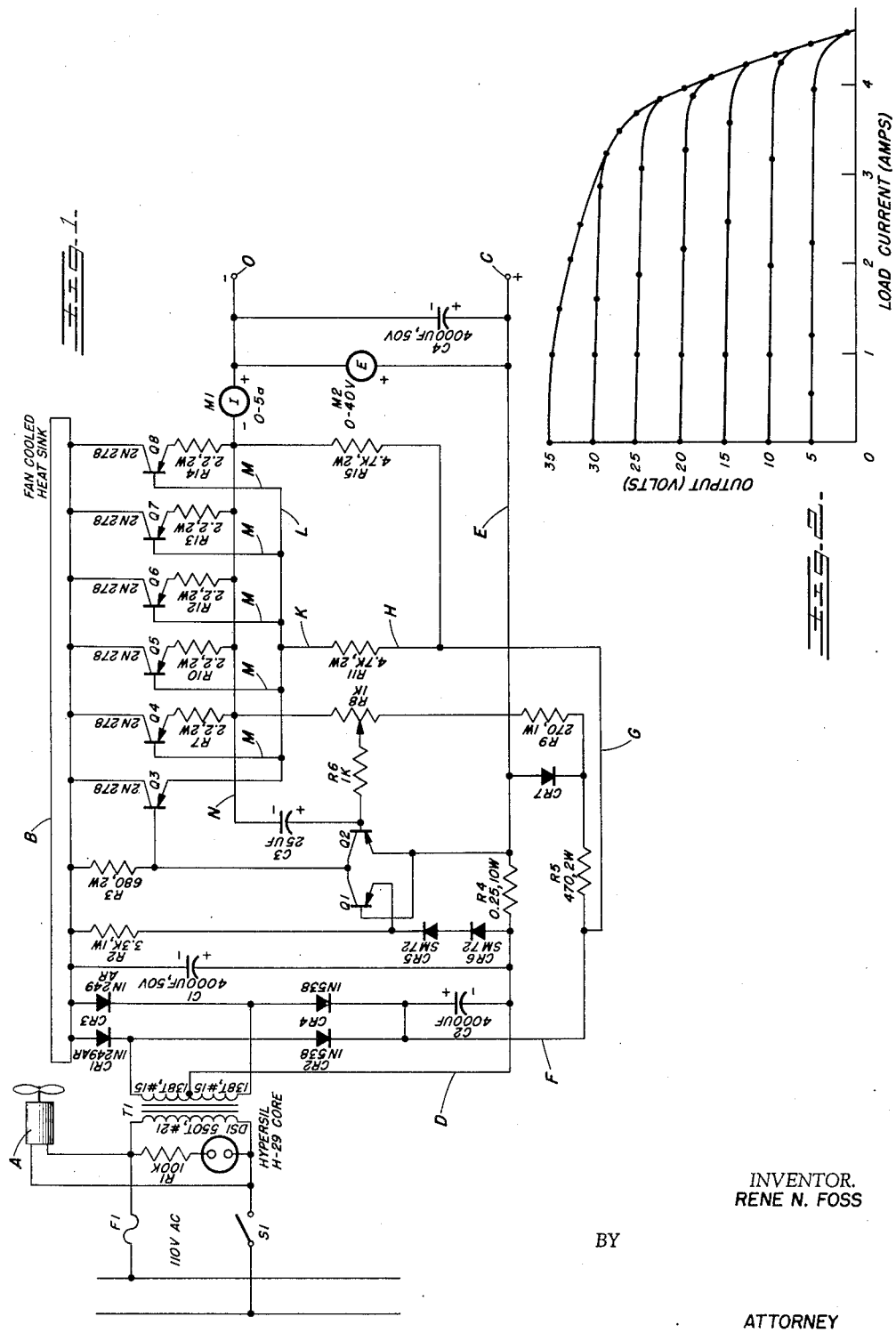
INVENTOR.
RENE N. FOSS
BY
ATTORNEY

United States Patent Office 3,038,112
Patented June 5, 1962

3,038,112
ELECTRICAL POWER SUPPLY
Rene N. Foss, Seattle, Wash., assignor to the United States of America as represented by the Secretary of the Navy
Filed Dec. 8, 1959, Ser. No. 858,220
2 Claims. (Cl. 321—18)

The present invention relates to an improved electrical power supply.

One object of the invention is to provide an electrical power supply which will accept without damage a short circuit of any duration and restore normal output voltage immediately upon removal of the short circuit.

Other objects of the invention are to provide a regulated electrical power supply that will be completely transistorized, and which will be light in weight, portable, rugged, and capable of giving trouble-free service.

Additional features of the invention include the provision of a single power transformer for supplying both the main output voltage and the necessary control circuit voltage, and a single heat sink for the semi-conductors employed in the voltage regulation circuit.

Other objects and many of the attendant advantages of the invention will be readily appreciated as the same becomes better understood by reference to the following detailed description when considered in connection with the accompanying drawings, wherein:

FIG. 1 is a circuit schematic of the improved power supply; and

FIG. 2 is a chart illustrating regulation curves for the power supply, voltage output versus current for a number of voltage values and load conditions having been plotted.

Referring to the drawing in more detail, and first to FIG. 1 thereof, the improved power supply includes a power transformer T1 having a primary winding for connection to a conventional service line through a fuse F1 and a switch S1. A small motor-driven fan A is connected across the primary winding of the transformer T1 between the fuse and switch and said primary. A neon indicator lamp DS1 and a resistor R1 are also connected, in series, across the transformer primary, between the fuse and switch and said primary.

The opposite end terminals of the secondary of the transformer T1 are connected to corresponding terminals of diodes CR1 and CR3, the opposite corresponding terminals of said diodes being connected to a bus B which constitutes a heat sink. The heat sink may conveniently comprise an aluminum extrusion shaped as a flat plate having cooling fins. The diodes may be silicon power diodes of 20 ampere capacity. The heat sink bus B is positioned in the path of air produced by the fan A, for carrying off heat, in a manner to be described hereinafter. The secondary of transformer T1 is center-tapped and the center tap is connected to a positive output terminal C by conductor D, a resistor R4, and an output conductor E. A filter capacitor C1 is connected between the heat sink and the conductor D and cooperates with the diodes CR1 and CR3 to provide a full-wave rectifier-filter combination for producing the main voltage for the power supply. The A.C. output voltage of the transformer secondary is approximately 40 volts at each side of the center tap.

The secondary of the transformer T1 also provides voltage for the control circuitry to be described hereinafter, rectification and filtering of the control voltage being effected by diodes CR2 and CR4, and capacitor C2. The control circuitry includes transistors Q4, Q5, Q6, Q7, and Q8. The collectors of these transistors are connected to the heat sink B and the bases are connected to the output of the rectifier-like combination CR2, CR4, C2 by conductors F, G, H, bleeder resistor R11, and conductors K, L, and M. The emitters of transistors Q4 through Q8 are connected, through balancing resistors R7, R10, R12, R13, and R14 respectively, to a negative output bus N, and control voltage is supplied to this bus from the rectifier-filter combination CR2, CR4, C2 by the conductor F, a dropping resistor R5, a series resistor R9 and the resistance element of an output control potentiometer R8. A diode CR7, of the well-known Zener type, is connected between the output conductor E and the junction between the resistors R5 and R9. A second bleeder resistor R15 is connected between the negative output conductor N and the junction of the conductors G and H.

The control circuitry includes voltage reference diodes CR5 and CR6 (silicon forward conduction reference diodes) which are connected in series between the conductor D and the heat sink B, a resistor R2 being interposed in the circuit between the diode CR5 and said heat sink. Transistors Q1, Q2, and Q3 provide amplification and control, as will be explained in more detail hereinafter. The base of the transistor Q1 and the emitter of the transistor Q2 are connected to the junction of the resistor R4 and the positive output conductor E. The emitter of transistor Q1 is connected to the junction of the resistor R2 and the diode CR5. The base of the transistor Q2 is connected to the positive terminal of electrolytic capacitor C3, the negative terminal of said capacitor being connected to the negative output conductor N. The base of transistor Q2 is also connected to the arm of the potentiometer R8 through a resistor R6. The collectors of the transistors Q1 and Q2 and the base of the transistor Q3 are connected together and to one terminal of a resistor R3, the other terminal of said resistor R3 being connected to the heat sink B. The collector of transistor Q3 is connected to the heat sink B and the emitter of said transistor to the conductor L.

To measure current output of the power supply an ammeter M1, having a range of 0–5 amperes, is connected between the junction of the resistor R14 with the negative output bus N and a negative output terminal O. Voltage output is measured by a voltmeter M2, which has a range of 0–40 volts and is connected between the output terminals O and C. For a purpose to be described hereinafter a capacitor C4 is connected between the output terminals O and C.

The operation of the invention will now be briefly described.

Referring again to the schematic (FIG. 1), CR1 and CR3 are the rectifiers for obtaining the main voltage supply, which is a conventional full-wave rectifier operating into a 4,000-microfarad filter capacitor (C1). CR2 and CR4 use the same transformer, and are connected as full-wave rectifiers to generate the positive voltage necessary for some of the control circuitry. The power transistors Q4 through Q8 represent the main series element in the voltage regulation circuit. The output voltage is sampled across the potentiometer R8; transistor Q2 is the regulator amplifier. Transistor Q3 is an additional stage of current amplification to improve the voltage stabilizing properties of the power supply. The purpose of capacitor C3 is to make the A.C. gain around the regulating loop a maximum value regardless of the setting of the D.C. voltage control potentiometer R8, so as to obtain the maximum amount of ripple filtering action from the voltage control circuit.

With the amount of filter capacitance used and the regulating properties of the voltage stabilizing circuit, the ripple is essentially zero at small currents and increases to a maximum of about 50 millivolts when four amperes is drawn from the device. This, of course, can be decreased, if desired, by increasing the value of C1.

The purpose of the large capacitor C4 across the output is to render the unit free of transients caused by sudden changes of load. The storage in this capacitor causes sufficient "electrical inertia" to hold any actual change in output to a rate that the voltage regulation circuits can handle without overshoot. This capacitor does not contribute to ripple suppression, as it is connected across a very low dynamic impedance point.

The feature of this power supply which makes it immune to damage by overload is generated by Q1, CR5, CR6, and R4. R4 is in the path of the return flow of current; thus, the voltage across it will be directly proportional to the output current. When this voltage exceeds the reference voltage of CR5 and CR6, which is a little over a volt, transistor Q1 will start to conduct. Conduction of Q1 increases the voltage on the base of Q3, which causes the output voltage, and thus, the current, to be cut down. With the values given, the maximum current is limited on short circuit to about 4.6 amperes. This can be changed to any desired value of limitation by simply changing the value of R4, which could, of course, be a front-panel-controlled variable element.

With power supplies which do not have this short-circuit protection, it is possible to gang the voltage control potentiometer with a Variac (in the 110 v. input line) so that the non-regulated voltage is, at all times, only a little above the desired regulated voltage, and the series regulating elements have only to dissipate the difference in power between these two voltages. However, this is not possible in a device of this sort, since, if the voltage is set to the maximum value and a short circuit occurs, it will be necessary for the series elements to dissipate the full power of the device. Therefore, the series regulating elements must have sufficient power dissipation to stand this drain, and a good heat sink is required.

FIG. 2 shows the regulation curves for this power supply. The voltage was set, with no load initially, to values of 5, 10, 15, 20, 25, 30, and 35 volts. For each of these initial settings, the output load was increased up to short-circuit condition and the resulting voltage output versus current was plotted. It will be noticed that at low output voltages the dynamic output impedance is lower than at higher values. This is because the feedback around the loop is a little higher at low values because the tap on the potentiometer is higher, thus taking a larger dynamic sample. It will also be seen that the supply is useful to about 3.5 amperes over most of the voltage range, with the circuit limited to 4.6 amps on short circuit.

The purpose of R11 and R15 is to take care of leakage current ($I_{c_0}$) in Q3 through Q8, thus allowing the output voltage to be adjustable down to a few tenths of a volt. These resistors, it will be observed, return these leakage currents to a fairly high positive point (about 40 volts), thus allowing the resistors to be of such size as to easily take care of all possible leakage current when the supply output voltage is set near zero voltage, and still not pass excessive current when the output voltage is set high.

As soon as the circuit is operating normally, resistor R6 will actually degrade the performance somewhat by decreasing the amount of current that is fed into the base of Q2. Its purpose, however, is to prevent damage to Q2 and the other elements if the internal potentiometer is set to deliver a low voltage and the output voltage does not fall externally (for example, if the supply is connected to a battery or some other source). In this case this resistor will protect Q2 from excessive base current. This slight degradation of normal performance is accepted in the interest of giving a more rugged, trouble-free device. A large diode can also be put in series with the output, if its added drop is not bothersome; this will also do some of the same work.

The above described circuit is so arranged that most of the semi-conductor devices which require a heat sink have their hot elements at the same electrical potential, so that no mica washers are necessary, and a low thermal gradient to one common heat sink is possible.

This power supply is electrically rugged and can withstand loading in any manner without injury. Short circuits of any duration are acceptable, and voltage is restored immediately on removal of the short circuit. It is designed to be light, portable, and capable of giving rugged, trouble-free service.

Obviously many modifications and variations of the present invention are possible in the light of the above teachings. It is therefore to be understood that within the scope of the appended claims the invention may be practiced otherwise than as specifically described.

What is claimed is:

1. An electrical power supply comprising, in combination: a first D.C. power source, including a series regulator device having a control electrode and presenting series dropping resistance adjustable in accordance with the magnitude of control current supplied to said control electrode, for delivering D.C. output voltage and output current to a utilization circuit; means including a second D.C. power source additively combined with said first D.C. power source for supplying current to said control electrode; means including a first reference voltage provided by said second D.C. power source, for deriving from said output voltage a first error voltage corresponding to variations of said output voltage from a predetermined level; means including a regulator amplifier device, responsive to said first error voltage, for automatically adjusting the magnitude of said control current to effect stabilization of said output voltage; means including a second reference voltage provided by said first D.C. power source, for deriving from said output current a second error voltage corresponding to variations of said output current exceeding a predetermined level; and means responsive to said second error voltage for automatically reducing the magnitude of said output current to effect output current limiting to a predetermined maximum magnitude.

2. An electrical power supply comprising, in combination: a first D.C. power source, including a series regulator transistor having a control electrode and presenting series dropping resistance adjustable in accordance with the magnitude of control current supplied to said control electrode, for delivering D.C. output voltage and output current to a utilization circuit; control voltage means including a second D.C. power source additively connected with said first D.C. power source, for supplying current to said control electrode; means including a first reference voltage provided by said control voltage means, for deriving from said output voltage a first error voltage corresponding to variations of said output voltage from a predetermined level; means including a regulator amplifier transistor responsive to said first error voltage, for automatically adjusting them agnitude of said control current to effect stabilization of said output voltage; means including a second reference voltage provided by said first D.C. power source, for deriving from said output current a second error voltage corresponding to variations of said output current exceeding a predetermined level; and means responsive to said second error voltage for automatically reducing the magnitude of said output current to effect current limiting to a predetermined maximum magnitude.

References Cited in the file of this patent

UNITED STATES PATENTS

| | | |
|---|---|---|
| 1,967,903 | Reinhardt | July 24, 1934 |
| 2,119,130 | Ehrensperger | May 31, 1938 |
| 2,733,402 | Bixby | Jan. 31, 1956 |
| 2,833,877 | Levy et al. | May 6, 1958 |
| 2,904,742 | Chase | Sept. 15, 1959 |
| 2,925,546 | Berman | Feb. 16, 1960 |
| 2,936,413 | Searcy | May 10, 1960 |
| 2,974,270 | Christiansen | Mar. 7, 1961 |